Jan. 22, 1935. L. BREGUET 1,988,537
ELECTRIC WELDING MACHINE
Filed Dec. 15, 1933
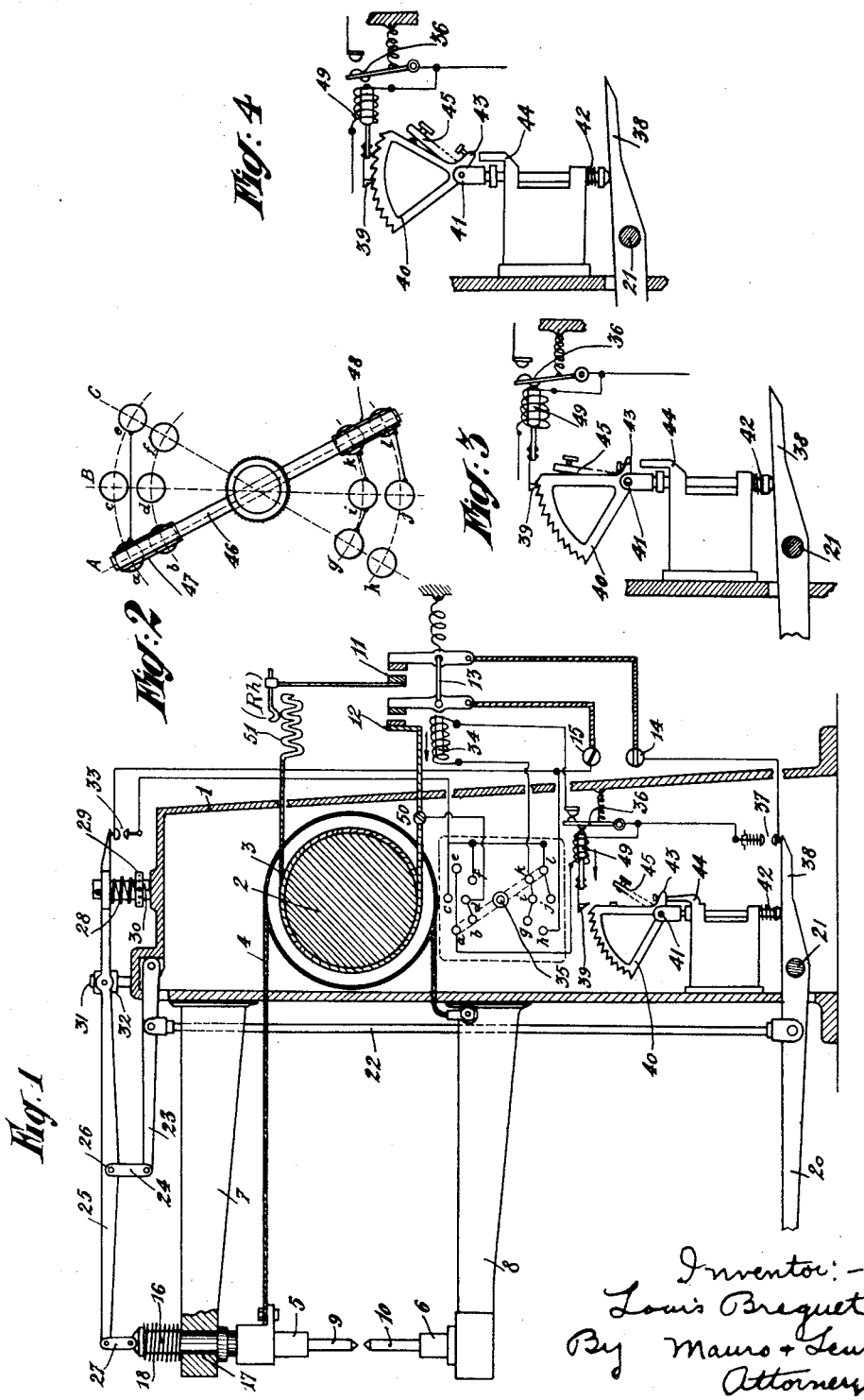
Inventor:-
Louis Breguet
By Mauro + Lewis
Attorneys Patented Jan. 22, 1935

1,988,537

UNITED STATES PATENT OFFICE 1,988,537

ELECTRIC WELDING MACHINE

Louis Breguet, Paris, France, assignor to Societe Anonyme des Ateliers d'Aviation Louis Breguet, Paris, France, a company of France Application December 15, 1933, Serial No. 702,635
In Germany December 20, 1932

7 Claims. (Cl. 219—4)

The machines that are employed at the present time for electric welding through the so called "resistance" method require, for generating the heating current, a transformer fed, at the voltage of ordinary distribution systems, with single-phase alternating current of industrial frequency.

These machines give good results for the welding of metals that are bad conductors of electricity when said metals are in the form of pieces of relatively great thickness, and, generally speaking, when the time for which the current is allowed to pass through the pieces is relatively long (one tenth of a second and more).

When it is desired to weld together metal pieces of relatively small thickness, such as steel parts used in aeronautical construction, the welding operation must be short (averaging one hundredth of a second). The machines above referred to then give irregular results and it is impossible to test the quality of a given welding joint.

Wattmetric devices for limiting the energy that is consumed in a welding joint have proved to be inoperative especially in the cases where only a portion of the period is utilized.

There are also improved electric welding machines fitted with a mechanical device for closing and opening the primary circuit of the transformer at a given time.

These apparati are extremely complicated, necessitate a constant supervision of the machine and the quality of the result that is obtained is still dependent on the good working of said apparatus.

On the other hand, all the machines that exist require a nominal power that is very high and quite disproportionate with the energy that is really utilized.

The object of the present invention is to provide an electric welding machine that obviates all these drawbacks. This machine is very simple and makes it possible to obtain, in a safe and efficient manner, welding joint elements that are all of the same quality and obtained in a relatively short time, without requiring the action of synchronized mechanical organs. On the other hand, the power required for working this machine does not exceed one hundredth of that employed in existing machines.

The principle of the machine according to my invention consists in placing the pieces to be welded in the circuit of a secondary winding provided on a magnetic core and in feeding the primary winding, mounted on said core, with current from a source of low voltage direct current (a battery of accumulators for instance). The current in the primary circuit is then suddenly cut off which brings the field back to zero and causes an important quantity of magnetizing potential energy to flow through the secondary circuit, said energy acting on the point where the pieces are to be welded together due to the fact that the resistance of the secondary circuit proper is negligible. It may be demonstrated by calculation that the energy available in the source of direct current is transformed partly into heat through the joulean effect and partly into another form of energy, of a potential and magnetizing nature, distributed through the mass of the core.

This magnetizing energy can be measured very accurately and in a rigorously uniform manner for each element of the wleding joint. It depends merely on the volume of the core and on the number of ampere-turns that produce the magnetizing field.

According to another embodiment of my invention the welding action is obtained not by breaking the primary circuit but by switching on current into said circuit, or by both of these actions, eventually repeated a certain number of times.

A preferred embodiment of the present invention will be hereinafter described, with reference to the accompanying drawing, given merely by way of example, and in which:

Fig. 1 is a diagrammatical vertical sectional view of the electric welding machine according to my invention;

Fig. 2 is a diagrammatical view of a control switch for modifying the mode of working of the machine;

Figs. 3 and 4 show two different positions, respectively, of an organ for controlling the successive passage of the current through the pieces to be welded and for limiting tht number of these successive passages.

A frame 1, made for instance of cast iron, supports a core 2 of large cross section, around which two windings are mounted. Winding 3 has a great number of turns and permits of obtaining the magnetic saturation of the core. The other winding 4 consists of a wire of relatively short total length and of relatively large cross section in which a current of high intensity is induced.

The ends of winding 4 are connected, either directly or indirectly, with two electrode carriers 5 and 6, connected to two arms 7 and 8 carried by frame 1. Electrodes 9 and 10 are disposed opposite each other in the usual manner.

The ends 11 and 12 of winding 3 are connected with the two contacts of a make and break device 13 which is itself connected with the feed terminals 14 and 15 of the machine.

The upper electrode carrier is carried by a movable head consisting essentially of a cylinder 16 adapted to slide in a bore 17 of arm 7 and urged in an upward direction by a spiral spring 18.

A pedal lever 20 pivoted to the frame at 21 makes it possible to exert a downwardly directed effort on rod 22 and this effort is transmitted through a connecting rod 23 and a shackle 24 to a beam 25 located at the upper part of the machine.

This beam, which is subjected at 26 to the downward action of the pedal, or, according to another embodiment of my invention, to the action of a pneumatic mechanism, acts, on one side on head 16 through a shackle such as 27 and, on the other side, on a strong spring 28 of determined strength the compression of which can be adjusted through means such as nut 29 and screw 30. A guide 31 and a sliding element 32 maintain and guide said beam 25.

As spring 16 is weaker than spring 28, on the one hand, and as, on the other hand, the point 26 where a downward effort is exerted on the beam can be nearer to head 16 than to spring 28, electrode carrier 5 and its electrode 9 are first displaced downwardly under the action of this downward effort until electrodes 9 and 10 come into contact with each other.

When this position is reached, head 16 cannot move any longer and spring 28 is crushed when the traction exerted by rod 22 assumes a well determined value, and consequently when the pressure with which the electrodes are applied against each other assumes a well determined value, which depends on the strength of spring 28 and can therefore be adjusted by means of nut 29 and screw 30.

The crushing of spring 28 causes a contact 33 to be operated as will be hereinafter explained.

The make and break switch 13 is actuated by an electro-magnet 34. The circuit of this electro-magnet, which is connected in shunt with the feed terminals of the machine, includes a control switch 35 shown in Fig. 2, an automatic circuit-breaker 36 operated through a relay 49, and a contact 37 operated by the end 38 of lever 20.

The movable core, or plunger of circuit breaker 36 is adapted to engage with the teeth of a sector 40 pivoted about a spindle 41 with a driving fit. Spindle 41 is carried by a sliding rod adapted to be moved upwardly by the end 38 of pedal lever 20. This sliding rod is urged in a downward direction by a small spring 42. Furthermore, a lug 43 rigid with toothed sector 40 is adapted to bear against a finger 44 when said sliding rod is in its lower position. This finger 44, carried by the frame of the machine, thus compels the toothed sector 40 to come back into a well determined position of rest when the sliding rod that carries it is in its lower position. A stop 45 adapted to be fixed on spindle 41 in any desired angular position with respect to sector 40 is adapted to limit the rotation of said sector.

Control switch 35 makes it possible to modify the connections between several auxiliary circuits so that the machine can be caused to work in either of the three following manners:

(a) The welding joint is obtained by switching on and off the magnetizing current, either once or several times successively (Fig. 2, position A);

(b) The welding joint is obtained by switching on the magnetizing current, the circuit being broken only after the electrodes have been moved apart (Fig. 2, position B);

(c) Finally, the welding joint is obtained by switching off the magnetizing current, said current having been switched on before the electrodes are brought into contact with each other (Fig. 2, position c).

The control switch 35 above referred to comprises essentially six contact studs disposed on two concentric circular arcs and on three diameters of said arcs, four contact studs being provided along each diameter (Fig. 2). These contact studs are thus grouped by pairs on each diameter on either side of the center of said circular arcs and can be connected with one another by means of an arm 46 made of an insulating material and carrying two contacting brushes 47 and 48.

It is thus possible to obtain the following connections: either $a$ with $b$ and $k$ with $l$ or $c$ with $d$ and $i$ with $j$ or $e$ with $f$ and $g$ with $h$.

The machine that has just been described permits of welding metal parts in either of the three manners that have been above described.

*First case.*—Welding by switching the current on and off.

Arm 46 being in the position A, shown in solid lines in Fig. 2, contact studs $a$ and $b$, on the one hand, and $k$ and $l$, on the other hand, are electrically connected together.

When the lever 20 is first depressed, contact 37 is closed. As circuit breaker 36 is normally in the closed position, it is only owing to the fact that contact 33 is still open that current is prevented from flowing through coil 34 of the make and break device.

As the lever 20 is being further depressed, the electrodes are brought into contact with each other and then the traction of beam 25 increases until spring 28 is crushed, which closes contact 33. The electric current is then allowed to flow through coil 34, the circuit thus made being as follows: 14, 37, 36, 34, $k$, $l$, 33 and 15. Switch 13 is thus brought into the closed position and the primary winding 3 is fed through 14, 11, 12 and 15. This corresponds to the switching on of the magnetizing current.

But then, through a circuit shunted at 50 to the primary winding, current is fed to the coil 49 of circuit breaker 36 through 14, 37, 49, $a$, $b$, $d$, 50, 12 and 15.

The feed circuit of coil 34 is thus broken at 36; the make and break switch 13 is brought back to the open position and the feed circuit of the primary winding is broken. This corresponds to the switching off of the magnetizing current.

If stop 45 has been previously adjusted in its extreme position on the left hand side, for which it is in contact with sector 40, the latter cannot turn, so that ratchet 39 carried by the core of circuit breaker 36 remains engaged in the first tooth of the sector and relay 36 remains open (Fig. 3).

If, on the contrary, stop 45 has been previously turned to the right into a position such as that shown in Fig. 1, circuit breaker 36 closes when switch 13 is brought back into the open position, since the circuit of its coil 49 is broken at 12, and pawl 39 causes the sector to turn through an angle corresponding to one tooth. The closing of circuit breaker 36 again causes coil 34 to be fed with current. Switch 13 is again successively closed and opened as above explained, sector 40 being again rotated through an angle corresponding to one tooth. This operation is repeated until sector 40 comes into contact with stop 45 (Fig. 4), and thus prevents, through pawl 39, circuit breaker 36 from coming back to its closed position. The welding operation is then completed. It will be understood that the number of successive openings and closings of the circuit depends on the position of movable stop 45.

When lever 20 is no longer depressed, contact 33 opens; then the electrodes are moved apart and finally contact 37 is opened. Sector 40, urged in a downward direction by spring 42, which acts on its supporting rod, remains in contact with the portion 38 of lever 20. Lug 43 is brought into contact with finger 44, which brings it back into its angular position of rest, in which the first tooth of the sector is located opposite pawl 39.

The machine is then ready to perform a second welding operation.

*Second case.*—Welding by switching on of the current.

The arm 46 of control switch 35 is in position B so that contact studs c and d, on the one hand, and i and j, on the other hand, are connected together.

As in the preceding case, make and break switch 13 is closed when spring 28 is crushed, that is to say when the electrodes have already been applied against each other with a certain pressure. The circuit of coil 34 is established through 37, 36, 34, k, i, j, l, 33 and 15 (circuit closed). But as the circuit of coil 49 of circuit breaker 36 remains open, current keeps flowing through winding 3 until contact 37 is opened, that is to say until after the electrodes have been moved apart. The opening of contact 37 opens the circuit of coil 34 and switch 13 is brought back into its opened position. (The opening of contact 33 had not opened the feed circuit of coil 34 which was then fed through 14, 37, 36, 34, i, j, l, c, d, 50, 12 and 15.)

*Third case.*—Welding by switching off of the current.

The arm 46 of control switch 35 is in position C. Contact studs e and f on the one hand, g and h on the other hand, are connected together. Stop 45 is in the position shown in Fig. 3 and prevents sector 40 from moving angularly about spindle 41.

When lever 20 is depressed, contact 37 is first closed and the circuit of coil 34 is closed through 14, 37, 36, 34, g, h, 15 before the electrodes are brought into contact with each other. Switch 13 then causes current to flow through winding 3.

When spring 28 is crushed down, that is to say when the desired pressure is applied to the electrodes, contact 33 closes and makes the circuit of the coil 49 of circuit breaker 36 through 14, 37, 49, e, f, 33, 15. The current is then cut off in coil 34, switch 13 opens and cuts off the current in the machine, thus producing the circuit breaking that induces the required current in the secondary circuit.

When contact 33 opens, circuit breaker 36 is not allowed to close its contact because pawl 39 remains engaged in the first tooth of sector 40. The latter is moved in a downward direction, thus releasing pawl 39 only when the electrodes are no longer in contact and at the very time when the feed circuit of coil 34 is broken at 37.

The advantages of the machine that has just been described are the following:

It is possible, with a given core, to vary the quantity of energy that is utilized by varying the value of a resistance 51 inserted in the magnetizing circuit, or by acting on the voltage of the feed current.

Welding takes place instantaneously, the time constant of the circuits being negligible. It does not depend on the time for which the feed current is allowed to flow.

The time of the welding operation can be given any desired value by increasing this time constant or by inserting a suitable resistance in the primary circuit. This time can be adjusted to the desired value by suitably proportioning the elements (self inductance and resistance) that are brought into play.

Finally, the safety of the machine is perfect, since the magnetizing energy cannot remain in the core when the field becomes zero and since it has no other outlet than the circuit of the electrodes.

Of course the primary circuit can be fed by a battery of accumulators of large output and small capacity and it may advantageously be maintained in the live state by the usual direct current generator of low power.

While I have described, with reference to the accompanying drawing, what I deem to be a practical and efficient embodiment of my invention, it should be well understood that I do not wish to be limited thereto as there might be changes made in the arrangement, disposition and form of the parts, without departing from the principle of my invention as comprehended within the scope of the appended claims.

What I claim is:

1. An electric welding machine of the type described, which comprises in combination, a frame, a magnetic core supported by said frame, a primary winding on said core, a secondary winding on said core, an electrode rigidly fixed to said frame electrically connected to one end of said secondary winding, another electrode movable in said frame electrically connected to the other end of said secondary winding, a beam slidably and pivotally mounted on said frame, operating means for acting on said beam, mechanical means for connecting said beam to said movable electrode, whereby said electrode can be applied and pressed against the other electrode, two terminals connected to a source of direct current at low voltage, a switch mounted between the terminals of said primary winding and the above mentioned terminals connected to a source of current, and means operative by both said operating means and said beam for actuating said switch.

2. An electric welding machine of the type described, which comprises in combination, a frame, a magnetic core supported by said frame, a primary winding on said core, a secondary winding on said core, an electrode rigidly fixed to said frame electrically connected to one end of said secondary winding, another electrode movable in said frame electrically connected to the other end of said secondary winding, a beam slidably and pivotally mounted on said frame, means for connecting said beam to said movable electrode, a pedal, articulated means for imparting the movement of said pedal to said beam, whereby the electrode can be applied and pressed against each other, elastic adjustable means for limiting the pressure with which the electrodes can be applied against each other, two terminals connected to a source of direct current at low voltage, a switch mounted between said terminals and the terminals of the primary winding, and means operative by both said pedal and said beam for actuating said switch.

3. A machine according to claim 2 in which the last mentioned means are so arranged that they successively close and open said switch after the electrodes have been applied against each other and before they are moved apart.

4. A machine according to claim 2 in which the last mentioned means are so arranged that they successively close and open said switch after the electrodes have been applied against each other and before they are moved apart, further including means for automatically repeating this operation of the switch a plurality of times during this interval of time, and adjustable means for limiting this repeated operation to a predetermined number of times.

5. A machine according to claim 2 in which the last mentioned means are so arranged that they close said switch after the electrodes have been applied against each other and open it after said electrodes have been moved apart.

6. A machine according to claim 2 in which the last mentioned means are so arranged that they close said switch before the electrodes are applied against each other and reopen it before said electrodes have been moved apart.

7. A machine according to claim 2 further comprising a plurality of contact studs, a control arm adapted to occupy at least three different positions for interconnecting said contact studs, and auxiliary circuits connected with said contact studs so as to coact with the last mentioned means of claim 5 in such manner that, for one position of said arm, said means successively close and reopen said switch after the electrodes have been applied against each other and before they are moved apart, for another position of said arm, said means close said switch after the electrodes have been applied against each other and reopen it after said electrodes have been moved apart, and, for the third position of said arm, said means close said switch before the electrodes are applied against each other and reopen it before said electrodes have been moved apart.

LOUIS BREGUET.